(12) United States Patent
Alexandru

(10) Patent No.: US 7,508,737 B1
(45) Date of Patent: Mar. 24, 2009

(54) ULTRASOUND RECEIVE BEAMFORMER

(75) Inventor: Radu Alexandru, Cheshire, CT (US)

(73) Assignee: Aloka Co., Ltd., Tokyo (JP)

( * ) Notice: Subject to any disclaimer, the term of this patent is extended or adjusted under 35 U.S.C. 154(b) by 0 days.

(21) Appl. No.: 11/936,245

(22) Filed: Nov. 7, 2007

(51) Int. Cl.
*G03B 42/06* (2006.01)
(52) U.S. Cl. .................................... 367/103
(58) Field of Classification Search ................. 367/103, 367/105, 119, 122, 123; 342/354, 377, 383; 600/437, 447, 472; 702/189, 190
See application file for complete search history.

(56) References Cited

U.S. PATENT DOCUMENTS

| | | | | |
|---|---|---|---|---|
| 5,469,851 A | | 11/1995 | Lipschultz | |
| 5,827,188 A | * | 10/1998 | Wright et al. | 600/447 |
| 5,905,692 A | * | 5/1999 | Dolazza et al. | 367/123 |
| 2006/0173335 A1 | * | 8/2006 | Shah et al. | 600/447 |

* cited by examiner

Primary Examiner—Dan Pihulic
(74) Attorney, Agent, or Firm—Bachman & LaPointe, P.C.

(57) ABSTRACT

In an ultrasound receive beamformer signals from two or more aperture elements are multiplexed at the input of each beamformer channel, stored in different portions of a delay memory, delayed and apodized in a time-multiplexed fashion, demultiplexed at the output of the channel, and summed in different summation units running at an upsampled rate. The partial sums are then time-aligned, summed to produce the total upsampled beam sum, filtered and decimated in an interpolation filter to produce the beamformed signal.

17 Claims, 6 Drawing Sheets

ULTRASOUND RECEIVE BEAMFORMER

BACKGROUND OF THE INVENTION

The invention relates generally to ultrasound image processing. More specifically, embodiments of the invention relate to systems and methods for focusing received ultrasound beams.

In ultrasound imaging, a transducer is used to transmit ultrasound beams into a medium such as the human body to be examined. The transmitted beams are reflected from various discontinuities in a region of the human body. Received ultrasound echoes are converted into electrical signals which undergo a number of processing steps and are eventually transformed into an image which can be displayed or printed for examination.

Ultrasound transducers are arrays of small rectangular piezoelectric elements. A subset of the elements in an array is used to transmit or receive an ultrasound beam and is called a transmit or receive aperture, respectively. The signal received by each element in the aperture is amplified and filtered, and input to a channel of a multi-channel receive beamformer.

The beamformer applies different delays and apodization weights to the signals from each element in an aperture in order to form beams focused along linear directions. To speed-up the image formation process, it is desirable to concurrently form from the same set of received signals, multiple beams focused along different directions (parallel beams). A straightforward implementation requires different channels to be used for each aperture element and each parallel beam, making the beamformer cost, size and power consumption increase in proportion to the product of the number of elements in a transducer array and the number of parallel beams. Because it is desirable to increase both the number of elements in the aperture and the number of parallel beams, the complexity of the beamformer becomes a limiting factor in ultrasound imaging systems.

To reduce the cost, size and power consumption of beamformers, it is known to share the hardware of a channel, or parts of a channel to form two or more parallel beams. However, this still requires one set of channel hardware components for each transducer element in an aperture To reduce beamformer complexity, synthetic aperture techniques are used. Synthetic aperture uses multiple transmit events for each receive aperture, and after each transmit, the signal is received on a different subset of elements of the receive aperture. The beams are reconstructed from the signals received during the multiple transmit/receive events. This allows a reduction in the number of receive channels, but increases the complexity of ancillary circuits. This method also suffers from motion artifacts whose correction further complicates the beamformer circuit.

By summing signals from symmetrical elements with respect to the center of the aperture and using one channel for each sum of signals from two elements, the number of channels can be reduced by a factor of two. However, this approach only works when the beam is not steered and is not well suited for parallel beams.

SUMMARY OF THE INVENTION

The inventor has discovered that it would be desirable to have a system and method that reduces the hardware complexity of ultrasound receive beamformers. Each channel of the receive beamformer multiplexes signal samples originating from two or more aperture elements and stores them in different portions of a memory. The signals are delayed and apodized in a time-multiplexed fashion, demultiplexed at an output, and partially summed in different summation units running at an upsampled rate. The partial sums are then time-aligned and output, and summed to produce a total beam sum. The beam sum is filtered and decimated in an interpolation filter to produce a beamformed signal.

One aspect of the invention is a receive beamformer. Receive beamformers according to this aspect comprise one or more beamformer channels $$\frac{E}{N},$$

where a total number of transducer element E signal samples are coupled to a plurality of channel beamformer inputs N, each beamformer channel comprising, a plurality of channel beamformer inputs N configured to receive signal samples originating from a plurality of transducer elements E at a predetermined sampling rate $f_s$, each channel beamformer input N is associated with a unique transducer element E, a multiplexer having a plurality of inputs corresponding to the plurality of channel beamformer inputs N and coupled to the plurality of channel beamformer inputs N, and an output, the multiplexer configured to multiplex transducer element signal samples received at the plurality of channel beamformer inputs N at a rate of $Nf_s$, a delay memory having an input coupled to the multiplexer output, a delay control input, and an output, the delay memory configured to store received transducer element signal samples at a rate of $Nf_s$, an apodization multiplier having an input coupled to the output of the delay memory, an apodization control input, and an output, the apodization multiplier configured to receive apodization weights from the apodization control input that correspond with each transducer element's signal sample output by the delay memory and apodizes (multiplies) the transducer element's signal sample with the apodization weight, a plurality of demultiplexing registers corresponding to the plurality of channel beamformer inputs N, with each demultiplexing register associated with a transducer element, each demultiplexing register having an input coupled to the output of the apodization multiplier, and an output, each demultiplexing register configured to store a transducer element's apodized signal sample, a plurality of sum controllers corresponding to the plurality of demultiplexing registers, each sum controller having an input coupled to an output of a demultiplexing register, a delay control input, and an output, each sum controller configured to upsample each apodized, transducer element's signal samples by inserting L−1 zero-value samples between each pair of signal samples input to a sum controller, where L is an interpolation factor, and store a subsample part from the delay control input of an overall delay and output either a transducer element's apodized signal sample or a zero-value sample depending on the subsample part, and one or more subsummers corresponding to the plurality of sum controllers, each subsummer having a plurality of inputs corresponding to the number of channels $$\frac{E}{N},$$

each input coupled to outputs from channel sum controllers that have the same timing delay and an output, each subsummer configured to sum together the delayed, apodized, and upsampled transducer element signal samples from each beamformer channel subsummer that have the same timing delay, one or more delays corresponding to the one or more subsummers, each delay having an input coupled to an output of a subsummer, and an output, each delay configured to time-align its delayed, apodized, upsampled, summed transducer element signal sample with all other delayed, apodized, upsampled, summed transducer element signal samples in the plurality of delays, a summer having one or more inputs corresponding to the plurality of delays, each input coupled to a delay output, and an output, the summer configured to sum all of the plurality of delayed, apodized upsampled, summed and time-aligned transducer element signal samples, an interpolation filter having an input coupled to the summer output and a receive beamformer output, the interpolation filter configured to filter the summed signal samples and output a beamformed signal at the predetermined sampling rate $f_s$, an apodization controller having an apodization control output coupled to the one or more beamformer channels' apodization multipliers, the apodization controller configured to output an apodization weight to each beamformer channel's apodization multiplier for each delayed transducer element's signal samples output from the delay memory, and a delay controller having a delay control output coupled to the one or more beamformer channels' delay memories and sum controllers, the delay controller configured to output signal samples from each beamformer channel's delay memory belonging to each transducer element at a predetermined delay at a rate of $Nf_s$, and control each beamformer channel's sum controllers with a subsample part to produce partial sums wherein the apodization multiplier, demultiplexing registers, and sum controllers operate at a rate of $Nf_s$.

Another aspect of the invention is a beamforming method. Beamforming methods according to this aspect comprise receiving a plurality of signal samples taken from a corresponding number of transducer elements N at a predetermined sampling rate $f_s$, storing the received signal samples corresponding to each transducer element in predetermined portions of a delay memory at a rate of $Nf_s$, outputting the stored signal samples corresponding to each transducer element after a predetermined delay in a predetermined order, apodizing each delayed signal sample output from the delay memory by multiplying each delayed signal sample corresponding to a transducer element with a weight, upsampling the delayed and apodized signal samples corresponding to each transducer element by inserting L−1 zero-value samples between each pair of delayed and apodized signal samples, where L is an interpolation factor, time-aligning each delayed, apodized, and upsampled signal sample corresponding to each transducer element, summing all of the time-aligned, delayed, apodized, and upsampled signal sample corresponding to each transducer element, and filtering the summed signal samples to form a beamformed signal.

Another aspect of the invention is a beamforming method. Beamforming methods according to this aspect comprise receiving a plurality of signal sample streams E taken from a corresponding number of transducer elements at a predetermined sampling rate $f_s$, dividing the signal sample streams E into a plurality of channels yielding a number of signal streams per channel N, for each channel, storing the received signal samples corresponding to each transducer element in predetermined portions of a delay memory at a rate of $Nf_s$, outputting the stored signal samples corresponding to each transducer element after a predetermined delay in a predetermined order, apodizing each delayed signal sample output from the delay memory by multiplying each delayed signal sample corresponding to a transducer element with a weight, upsampling the delayed and apodized signal samples corresponding to each transducer element by inserting L−1 zero-value samples between each pair of delayed and apodized signal samples, where L is an interpolation factor, summing each delayed, apodized and upsampled signal sample stream in each channel with another delayed, apodized and upsampled signal sample stream from another channel, time-aligning each delayed, apodized, upsampled and summed signal sample stream, summing all of the time-aligned, delayed, apodized, and upsampled signal sample streams; and filtering the summed signal samples to form a beamformed signal.

One aspect of the invention is a receive beamformer outputting parallel beams. Receive beamformers according to this aspect comprise one or more beamformer channels $$\frac{E}{N},$$

where a total number of transducer element E signal samples are coupled to a plurality of channel beamformer inputs N, each beamformer channel comprising a plurality of beamformer inputs N configured to receive signal samples originating from a plurality of transducer elements E at a predetermined sampling rate $f_s$, each beamformer input N associated with a unique transducer element E, a multiplexer having a plurality of inputs corresponding to the plurality of beamformer inputs N and coupled to the plurality of beamformer inputs N, and an output, the multiplexer configured to multiplex transducer element signal samples received at the plurality of beamformer inputs N at a rate of $Nf_s$, where $$N = \frac{L}{P},$$

where L is an interpolation factor and P is the number of parallel beams output, a delay memory having an input coupled to the multiplexer output, a delay control input, and an output, the delay memory configured to store received transducer element signal samples at a rate of $Nf_s$ and output each transducer element signal sample P times at a rate of $Lf_s$, each time output after a predetermined delay, an apodization multiplier having an input coupled to the output of the delay memory, an apodization control input, and an output, the apodization multiplier configured to receive apodization weights from the apodization control input that correspond with each transducer element's signal sample output by the delay memory and apodizes (multiplies) the transducer element's signal sample with the apodization weight, for each parallel beam P a plurality of demultiplexing registers corresponding to the plurality of beamformer channel inputs N, with each demultiplexing register associated with a transducer element, each demultiplexing register having an input coupled to the output of the apodization multiplier, and an output, each demultiplexing register configured to store a transducer element's apodized signal sample, a plurality of sum controllers corresponding to the plurality of demultiplexing registers, each sum controller having an input coupled to an output of a demultiplexing register, a delay control input, and an output, each sum controller configured to upsample each apodized, transducer element's signal samples by inserting L−1 zero-value samples between each pair of signal samples input to a sum controller, where L is an interpolation factor, and store a subsample part specific to each beam P from the delay control input of an overall delay and output either a transducer element's apodized signal sample or a zero-value sample depending on the subsample delay part, a plurality of subsummers corresponding to the plurality of sum controllers per channel, each subsummer having a plurality of inputs corresponding to the number of channels $$\frac{E}{N},$$

each input coupled to outputs from channel sum controllers that have the same timing delay and an output, each subsummer configured to sum together the delayed, apodized, and upsampled transducer element signal samples from each beamformer channel subsummer that have the same timing delay, a plurality of delays corresponding to the plurality of sum controllers, each delay having an input coupled to an output of a sum controller, and an output, each delay configured to time-align its delayed, apodized, upsampled transducer element signal sample with all other delayed, apodized, upsampled transducer element signal samples in the plurality of delays, a summer having a plurality of inputs corresponding to the plurality of delays and an output, each input coupled to a delay output, the summer configured to sum all of the plurality of delayed, apodized, upsampled and time-aligned transducer element signal samples, an interpolation filter having an input coupled to the summer output, and a receive beamformer output, the interpolation filter configured to filter and decimate the summed signal samples and output a beamformed signal at the predetermined sampling rate $f_s$, an apodization controller having an apodization control output coupled to the apodization multiplier, the apodization controller configured to output an apodization weight to the apodization multiplier for each delayed transducer element signal sample output from the delay memory specific to each beam P, and a delay controller having a delay control output coupled to the delay memory and each sum controller, the delay controller configured to output signal samples from the delay memory belonging to each transducer element at a predetermined delay at a rate of $Lf_s$ specific to each beam P, and control each sum controller with a subsample part to produce partial sums specific to each beam P wherein the apodization multiplier, demultiplexing registers, and sum controllers operate at a rate of $Lf_s$.

Another aspect of the invention is a parallel beamforming method. Parallel beamforming methods according to this aspect comprise receiving a plurality of signal samples originating from a corresponding number of transducer elements E at a predetermined sampling rate $f_s$, determining a number of parallel beams P to be formed, determining a number of input signals per channel $$N = \frac{L}{P},$$

where L is an interpolation factor, dividing the signal sample streams E into a plurality of channels yielding a number of signal streams per channel N, for each channel, storing the received signal samples corresponding to each transducer element in predetermined portions N of a delay memory at a rate of $Nf_s$, outputting the stored signal samples corresponding to each transducer element P times, each time for a different beam P and delayed by a predetermined amount, apodizing each delayed signal sample output from the delay memory, by multiplying each delayed signal sample corresponding to a transducer element with a predetermined weight for each transducer element, upsampling the delayed and apodized signal samples corresponding to each transducer element P times, each time for a different beam P by inserting L−1 zero-value samples between each pair of delayed and apodized signal samples belonging to the same transducer element, where L is an interpolation factor, for each beam P, summing the corresponding delayed, apodized and upsampled signal sample streams of all channels to form subsums, time-aligning each subsum of delayed, apodized, upsampled signal sample streams, summing all of the time-aligned subsums of delayed, apodized signal sample streams; and filtering the summed signal samples to form a beamformed signal.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items. The terms "mounted," "connected," and "coupled," are used broadly and encompass both direct and indirect mounting, connecting, and coupling. Further, "connected," and "coupled" are not restricted to physical or mechanical connections or couplings.

It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Figure 1:
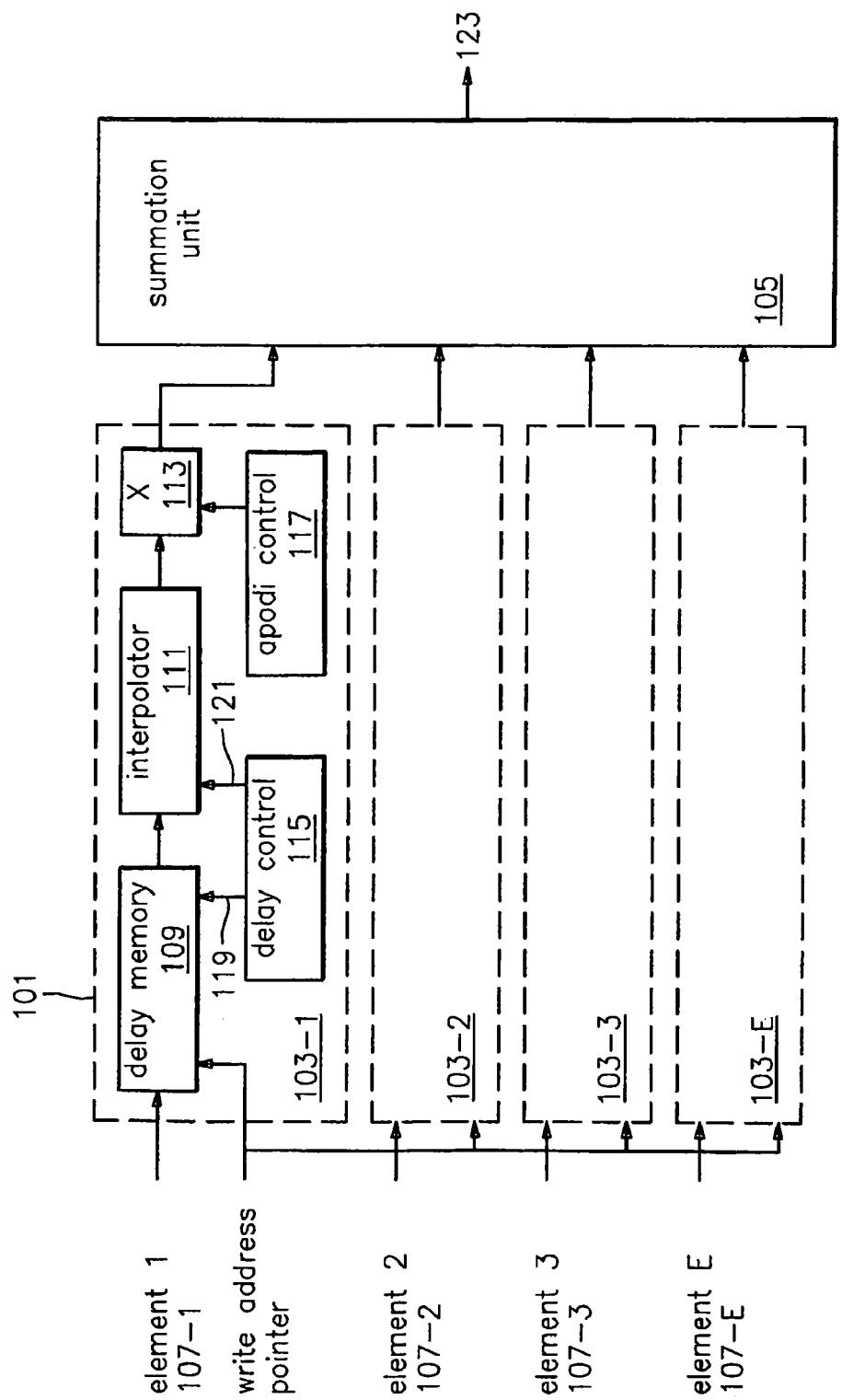
FIG. 1 shows a conventional digital receive beamformer architecture.

FIG. 1 shows a block diagram of a conventional digital receive beamformer architecture 101. The beamformer 101 comprises a plurality (E) of channels 103-1, 103-2, 103-3, . . . , 103-E (collectively 103) and a channel summation unit 105. Each channel 103 receives as input an amplified, filtered and digitized (discrete-time) signal 107-1, 107-2, 107-3, . . . , 107-E originating from elements of an ultrasound transducer array (not shown). Each channel 103 includes a dual-port delay memory 109, an interpolator 111, an apodization multiplier 113, a delay controller 115 and an apodization controller 117. In actual implementations, a large number of channels E typically in the range of from 32 to 1,024 may be used.

The dual-port delay memory 109 provides programmable delays in increments of one sample period or interval $T_S$, where $$T_s = \frac{1}{f_s}$$

and $f_s$ is the sampling frequency or sampling rate and is the number of samples obtained in one second. The sample frequency $f_s$ is typically four times the center frequency $f_c$ of the transducer. The temporal resolution of the delay memory 109 is the sample period of the A/D (analog to digital) converter. This is known as integer delay, and is implemented as a digital delay line where the delay is an integer multiple of samples. Digital delay lines are often implemented as circular buffers and are achieved by writing the input samples in memory at successive addresses starting with address 0, and later reading the samples from memory from addresses corresponding to the desired (integer) delay.

The size M of the delay memory 109 is determined by the maximum required delay. For most medical applications, when the input signal sampling frequency is close to four times the transducer center frequency, a memory size of M=256 samples is sufficient. The total number of samples for each beam is much larger than 256, but the memory is used in a circular fashion. When the memory address being written to exceeds 255, the write address pointer circles back to 0. For accurate beamforming, a delay accuracy equal to or better than $$\frac{1}{16 f_e}$$

is desired, representing delay increments of one quarter of the sampling period $T_S$. More generally, the required delay accuracy is $$\frac{T_s}{L}$$

where L is an integer that represents an interpolation factor. In this disclosure L=4 is typically used.

The interpolator 111 provides delay increments smaller than the sampling period $T_S$, known as subsample delay. The interpolator provides the sample value either at the sampling position or at one of L−1 equally spaced positions between the samples, as determined by a subsample delay control signal 121 provided by the delay controller 115. A set of successive samples per channel, usually four, are read from the memory 109 starting from the address corresponding to the integer delay minus 1, and are coupled to the interpolator 111 which calculates, or interpolates, the signal at the time between the samples. The delay is achieved in two steps. First, the integer sample delay, and second, the subsample delay. The delay controller 115 provides a delay signal comprised of a read address signal 119 representing an integer sample delay (typically 0 to 255) and the subsample delay control signal 121 representing the subsample delay (0 to 3 in the typical case when L=4).

The apodization controller 117 generates time-dependent apodization weights according to each element's position in the aperture. Usually the weights are calculated by the apodization controller 117 starting from a small number of parameters supplied by the system control unit. Typically a piecewise linear approximation circuit is used to generate the time-varying weights, but other methods may be used as well, for example, the apodization weight of an element may be 0 from start to a certain beam depth, and then take a constant non-zero value to the end of the beam depth.

The summation unit 105 adds the outputs of all channels 103 to produce a beamformed signal output 123. The summation unit consists of adders and registers arranged either in a tree or a pipeline or another multi-input adder structure known in the art.

As can be seen, the ultrasound beamformer architecture 101 used in medical ultrasound imaging requires extensive hardware resources. The interpolator 111 requires one multiplier if the interpolator 111 uses a four-tap interpolation kernel and operates four times faster than the input sampling frequency $f_s$, and has an interpolation factor L of four. Since multipliers consume a large silicon area which makes them expensive to implement, for economical operation, the minimum number of multipliers should be employed.

Figure 2:
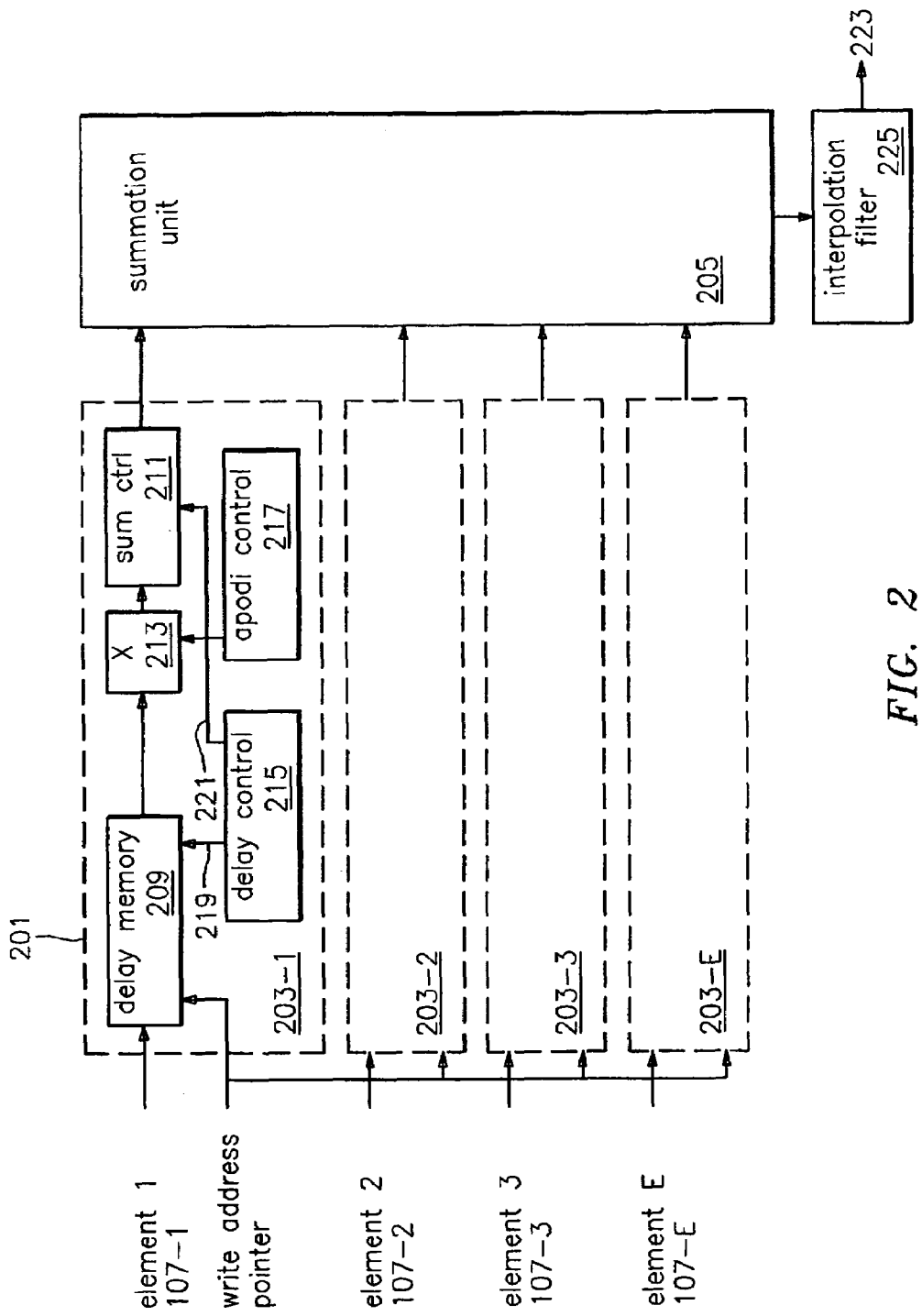
FIG. 2 shows an alternative digital receive beamformer architecture.

FIG. 2 shows another conventional digital receive beamformer architecture 201. The beamformer 201 is a modification of the beamformer 101 of FIG. 1, based on the digital signal processing interpretation of interpolation, where interpolation is viewed as a sequence of upsampling by a factor of L (inserting L−1 zero-valued samples between each pair of interpolation input samples, where typically L=4) followed by low-pass filtering. Because of the filtering operation linearity, filtering can be performed before or after channel summation with identical results.

The beamformer architecture 201 comprises a plurality of channels 203-1, 203-2, 203-3, . . . , 203-E (collectively 203), a summation unit 205 and an interpolation filter (low-pass filter) 225. Each channel 203 receives as input an amplified, filtered and digitized (discrete-time) signal 107-1, 107-2, 107-3, . . . , 107-E from an aperture element of an ultrasound transducer array (not shown). Each channel 203 includes a dual-port delay memory 209, a sum control unit 211, an apodization multiplier 213, a delay controller 215 and an apodization controller 217.

The summing unit 205 used in the beamformer 201 operates at L times the sampling frequency $f_s$, $Lf_s$, corresponding to upsampling by a factor of L. For each input sample there are L channel output samples, thus allowing a delay resolution L times higher than the sampling frequency $f_s$. While any integer upsampling factor L may be used, L=4 will be used for the example.

In each channel 203, the integer delay is achieved by the delay controller 215 selecting the appropriate sample from the delay memory 209. A subsample delay is created by reading a delayed sample from the delay memory 209, apodizing the sample 213 with a weight chosen by the apodization controller 217 and adding the delayed, weighted signal sample to one of the L samples in the upsampled channel output 223. The selection of the one out of L samples to which to add the delayed, apodized sample is effected by the sum control unit 211 under the control of the subsample delay signal 221 generated by the delay controller 215. The sum control unit 211 is comprised of gating means, for example, AND gates, and a control circuit. (Alternatively, the gating means may be incorporated in the summing unit 205 leaving only the control circuit in the sum control unit 211.) The control circuit compares the subsample delay signal 221 with a signal representing the position of the current sample (0 to L−1) of the upsampled stream, and enables the addition of the channel's delayed, apodized sample only to the proper sample in the upsampled stream, while adding 0 to the other samples. A simple way to implement the control circuit is by means of a small look-up table, for example, if L=4 then a 16-word look-up table may be used.

The interpolation filter 225 may be a (4×L)-tap finite impulse response (FIR) low-pass filter that operates at the upsampled rate L×$f_s$, reducing (decimating) the number of samples in the upsampled adder 205 output, back to the sampling frequency $f_s$. The interpolation filter 225 only has to compute every $L^{th}$ output of the summation unit 205, reducing the number of multipliers/adders needed to implement the filter 225 to four (not shown).

The beamformer 201 architecture uses a single interpolation filter 225 after summation 205 instead of one interpolator 111 in each channel 103, reducing the amount of hardware resources. Only one sample is read from the delay memory 209 for each channel 203 output sample. Replacing the interpolators 111, each requiring a multiplier, with a post-summation interpolation filter 225, requiring typically four multipliers if upsampled at a 4× rate, the total number of multipliers in the circuit is reduced. For example, for 32-channel beamformer architecture 201, the reduction would be 28 multipliers (32−4=28 multipliers) over the beamformer architecture 101 shown in FIG. 1. However, one apodization multiplier 213 is required for each aperture element.

Figure 3:
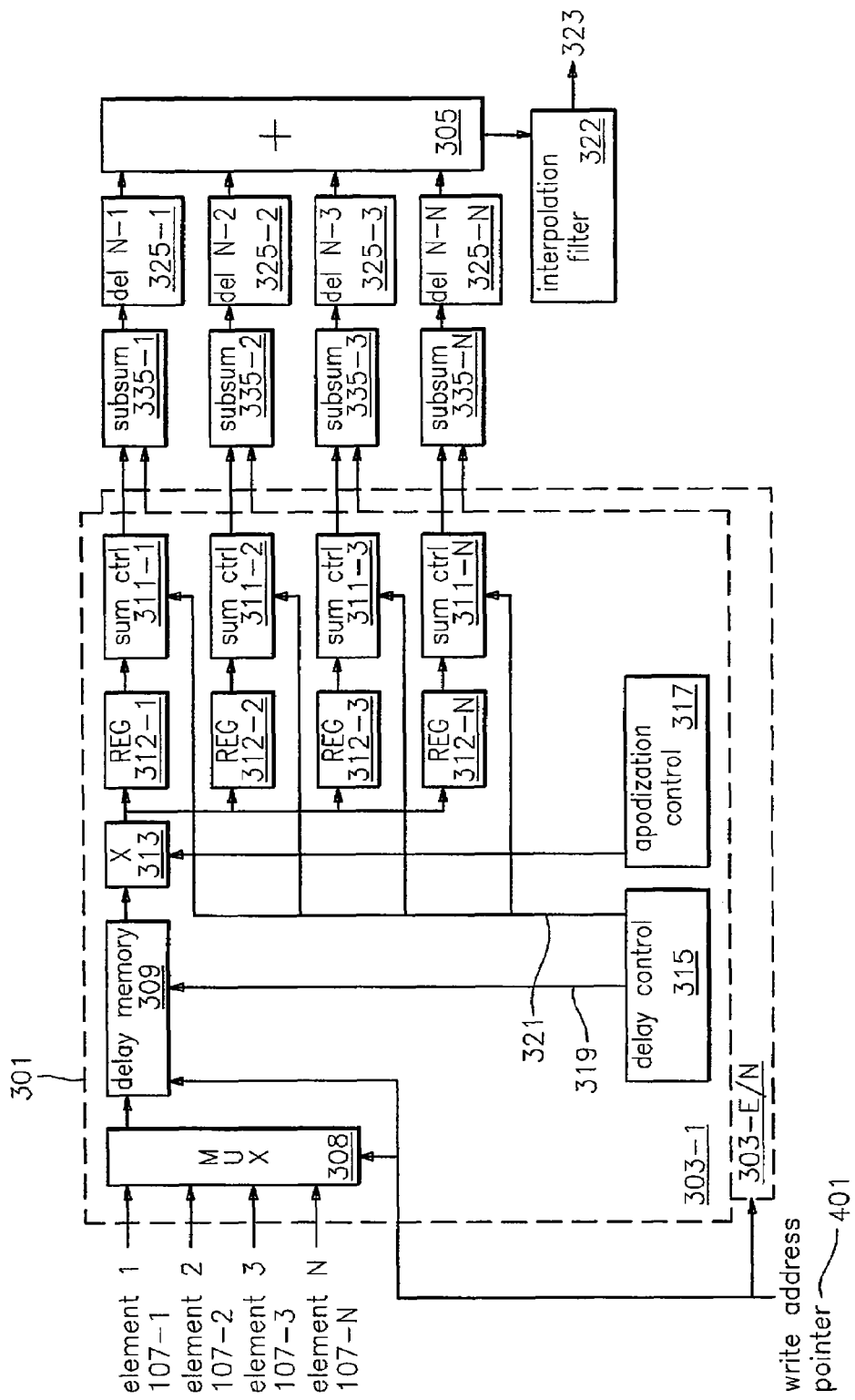
FIG. 3 shows an exemplary digital receive beamformer architecture according to the invention.

FIG. 3 shows a digital receive beamformer architecture 301 according to the invention which reduces the number of apodization multipliers by a factor of N. If the circuit technology employed to realize the architecture 301 is capable of operating N times faster than the input sampling frequency $f_s$ (where N may be an integer multiple of L) and a dual-port delay memory of N×M words is available (where M is the maximum size needed for one transducer element, typically 256) then N transducer aperture elements can share one channel and the number of channels can be reduced from E to $$\frac{E}{N}$$

(where E is the number of elements in the aperture) providing a reduction in the number of apodization multipliers by a factor of N.

The beamformer 301 comprises a plurality of channels 303-1, . . . , $$303 - \frac{E}{N}$$

(collectively 303, only the first 303-1 and last $$303 - \frac{E}{N}$$

of the channels are shown), a summation unit 305, subsum adders 335-1, 335-2, 335-3, . . . , 335-N (collectively 335), delay units 325-1, 325-2, 325-3, . . . , 325-N and an interpolation filter 322. The beam former 301 has a total of E inputs (only the first N inputs are shown in FIG. 3), each input 107-1, 107-2, 107-3, . . . , 107-N associated with an aperture element. Each channel unit 303 receives as input N amplified, filtered and digitized signals 107-1, 107-2, 107-3, . . . , 107-N from the total number of aperture elements E of an ultrasound transducer array (not shown) and includes a multiplexer 308, a dual-port delay memory 309, sum controllers 311-1, 311-2, . . . 311-3, . . . , 311-N (collectively 311), an apodization multiplier 313, a delay controller 315, an apodization controller 317 and demultiplexing registers 312-1, 312-2, 312-3, . . . , 312-N (collectively 312).

Each channel's (303) dual-port delay memory 309 is partitioned into N equal-sized areas, each of which is allocated to one of the N inputs 107.

Each channel 303 of the beamformer 301 multiplexes 308 the input signals 107, and delays 309 and apodizes them 313 in a time-multiplexed fashion. The multiplexed signals are then demultiplexed 312, gated 311 at the output, and coupled to the N subsum adders 335-1, 335-2, 335-3, . . . , 335-N. The subsum adders 335 outputs are time-aligned via delay units 325-1, 325-2, 325-3, . . . , 325-N (implemented, for example, with shift registers) and summed together 305. The summed signal is coupled to the interpolation filter 322 which calculates the output beamformed signal 323.

Figure 4:
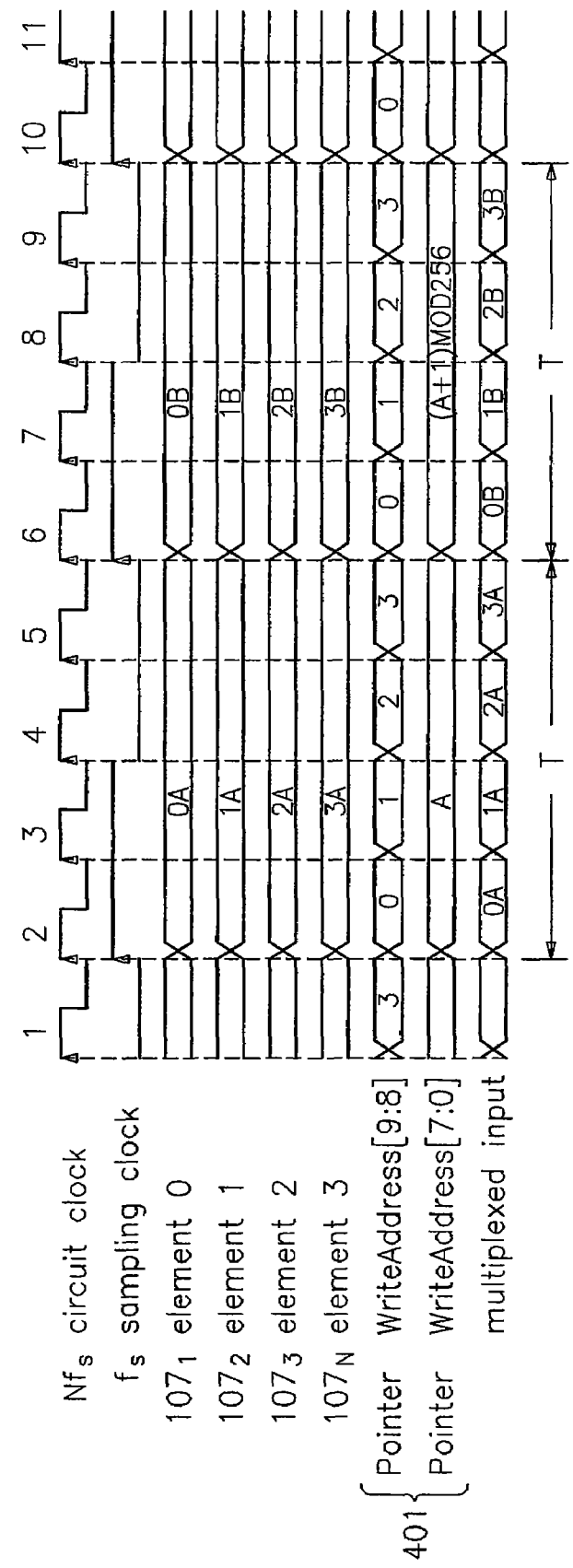
FIG. 4 is a timing diagram of the input operation of the beamformer of FIG. 3.

The time-multiplexed operation of the channel 303 is based on a circuit clock (not shown) which is N times faster than the input signal sampling rate $f_s$. FIG. 4 shows the channel input timing for the case N=4 and delay memory 309 for 1024 words. Samples 107-1, 107-2, 107-3, . . . , 107-N of the signals originating from the ultrasound transducer elements arrive at the input at the sampling clock frequency $f_s$, are multiplexed 308 and written to different portions of the dual-port delay memory 309 under the control of a write address pointer 401 generated by an input controller (not shown). A single set of input control signals (write address) is needed for all channels. Each signal sample 107 is allocated one circuit clock period $T_{CK}$ ( $$\frac{1}{N}$$

of the sampling clock) for writing to the memory 309.

The two most significant bits (MSB) of the write address pointer 401 (bits [9:8] if M=256) which are used to control the multiplexer 308, are changed from one write, to the next, to select different areas of the memory 309 for signal samples representing different aperture elements. The least significant address bits (bits [7:0]) are incremented only once per sampling period, once every N circuit clocks, such that the input samples for each element are written to successive addresses in the memory portions (in this example quarters) allocated to the respective element.

It should be understood that, for circuit timing reasons, registers may have to be inserted at different places in the block diagrams of this disclosure and in that case the timing diagrams have to be adjusted accordingly, as known to one skilled in the art. Modifications of the block diagrams such as insertion of registers and the corresponding adjustments of timing diagrams do not affect the substance of the disclosure.

The channel output operation takes place under the control of each channel's delay 315 and apodization controller 317. The channel delay 315 and apodization control 317 may be programmed with parameters generated by a system controller (not shown) according to each ultrasound transducer probe and operating mode. The delay 315 and apodization 317 controllers start their operation for each transmit/receive event at a "start" signal generated by a master timing controller (not shown), after which they operate autonomously to the end of that transmit/receive event.

Like the input, the output operation is time-multiplexed. In each sample period, the delay 315 and apodization 317 controllers generate delay and apodization control signals 319, 321 for the transducer elements, one in each of the N circuit clocks occurring during one sampling clock period. In the example with N=4 a 2-bit signal generated by the master timing controller (not shown) identifies which of the four transducer elements 107-1, 107-2, 107-3, and 107-4 is processed in each circuit clock period, and is also used as the two most significant bits of the dual-port memory read address pointer 401. For scalability, for example, if N=128, the signal generated by the master timing controller (not shown) would have seven bits instead of two. One sample belonging to the element processed in the respective clock cycle is read from the address in the respective quarter of the memory 309 indicated by the integer delay 319 from the delay controller 315, is multiplied with the respective apodization weight produced by the apodization controller 317 and is stored in one of the four output demultiplexing registers 312-1, 312-2, 312-3, 312-4. The subsample part of the delay is stored in a different sum control unit 311-1, 311-2, 311-3, 311-4 for each element; the stored value is later used to select one of four samples in the upsampled sum sequence to which the delayed sample is to be added.

The sum control units 311 may be a 2-bit register to store the subsample delay and a comparator (not shown) which may be implemented using a look-up table. The look-up table compares the subsample delay stored in the register with the current upsampled sample number (0, 1, 2 or 3, for example, for an interpolation factor L of 4); when the comparator detects the one of four samples in the upsampled sum sequence corresponding to the subsampled delay, it enables the demultiplexed, delayed and apodized sample to be added in a respective subsum adder 335. The gating means to enable the summation may be either in the sum control units 311 or in the subsum adders 335.

Figure 5:
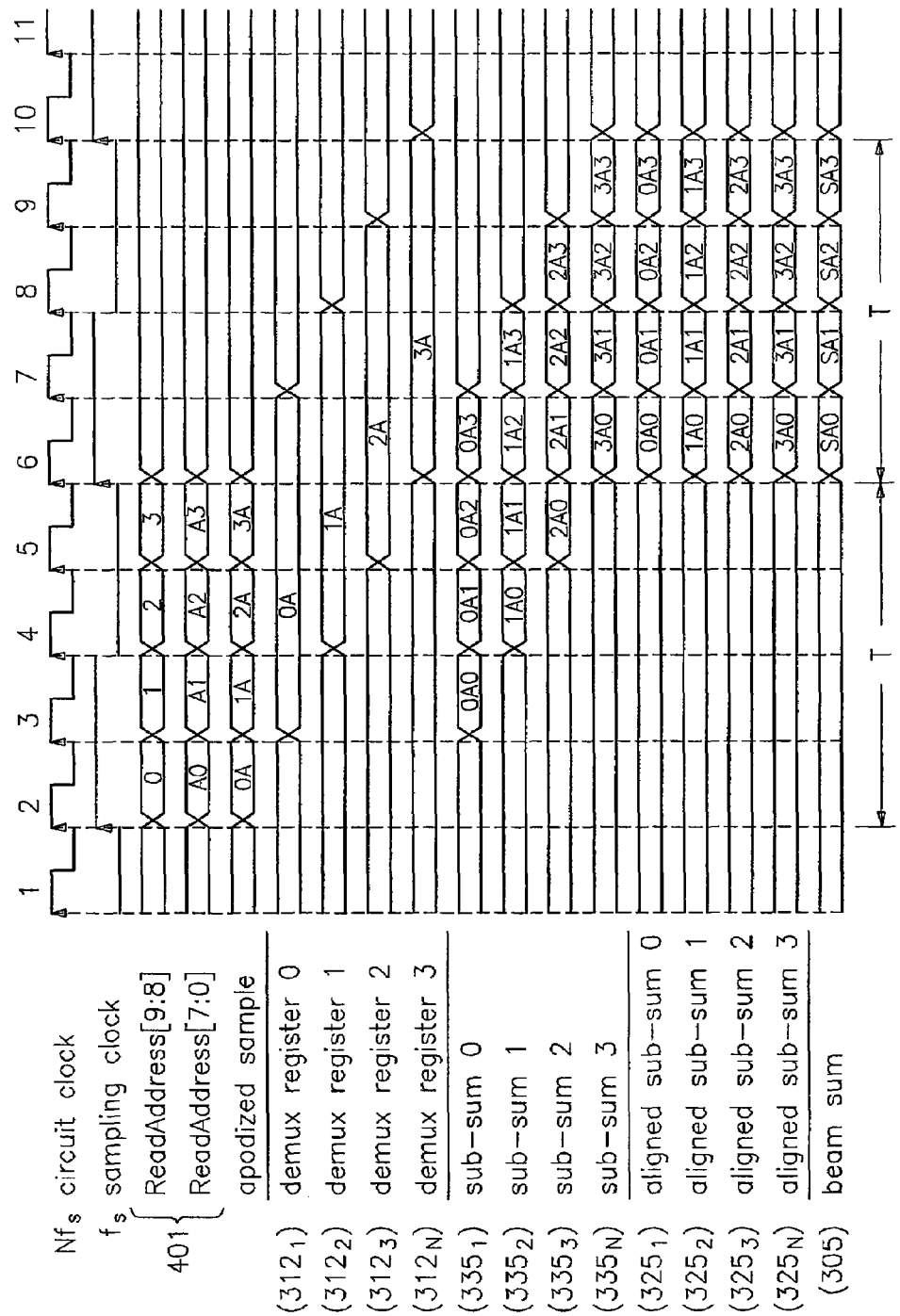
FIG. 5 is a timing diagram of the output operation of the beamformer of FIG. 3.

FIG. 5 shows the timing of the channel output operation for the case N=L=4. For ease of understanding, the waveform transitions are shown for only one output sample.

Due to time-multiplexing, there is a 1 circuit clock delay from element 0 to 1, from 1 to 2 and from 2 to 3, therefore the sum signal of elements 1, 5, 9, . . . appears at the output of subsumming adder 335-1 one clock earlier than the sum of elements 2, 6, 10, . . . appears at the output of subsumming adder 1 335-2, etc. To compensate, the output of subsumming adder 335-1 is delayed N−1 circuit clock cycles 325-1, the output of subsumming adder 335-2 is delayed N−2 circuit clock cycles 325-2, etc. such that when the N subsums are added together, they are all time-aligned.

The delay controller 315 may be designed according to known delay generation algorithms, such as piecewise linear approximation or a version of the mid-point algorithm or others. Multiple delay generators may be time-multiplexed to generate the delays for the multiple elements, or preferably one delay generator is enhanced to generate sequentially the delays for all the elements. The apodization controller 317 is typically of the piecewise linear approximation type and, as for the delay controller 315, multiple multiplexed apodization generators or an enhanced apodization generator may be used. In many cases the design may be configured such that the elements multiplexed at the input of one channel are geometrically adjacent; then it may be acceptable to use the same apodization but different delays for all multiplexed elements of one channel, resulting in a simpler apodization controller 317.

The beamformer architecture in FIG. 3 may also generate a number P of parallel beams. In a first case, when the circuit operates at a multiple P×L of the sampling frequency $f_s$, where P is the number of parallel beams and L is the interpolation factor, and only N=L elements are multiplexed into each channel then P parallel beams may be generated in a time-multiplexed fashion. For example, if the number of parallel beams P desired is two (P=2) and the number of beamformer inputs N is equal to four (N=4), the architecture must operate eight times the sampling frequency $f_s$. The first four circuit clock cycles (1-4) during one sampling period $T_s$ are used to process the signals originating from the four transducer elements using a first set of delays and apodization weights to form a first beam, and the next four circuit clock cycles (5-8) during the same sampling period are used to process the same signals using a second set of delays and apodization weights to form a second beam. The summing units 305, subsum adders 335 and interpolation filter 322 will process alternatively one sample of the first beam and one sample of the second beam.

If P parallel beams have to be generated but the circuit operates at only a multiple L of the sampling frequency, then a tradeoff must be made between the number of transducer elements processed by each channel and the number of parallel beams, namely one channel can process only $$N = \frac{L}{P}$$

elements.

Figure 6:
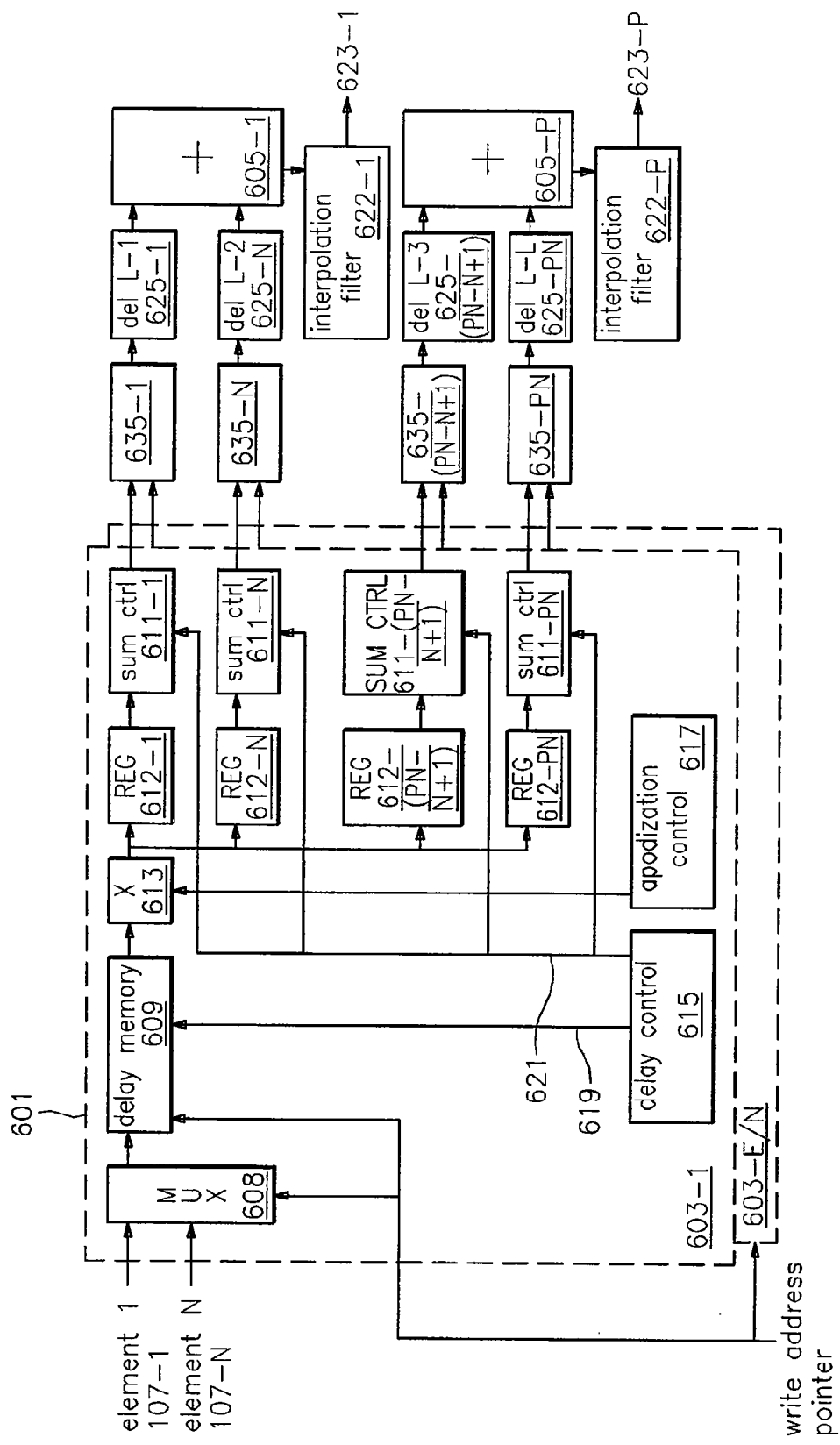
FIG. 6 shows an exemplary digital receive beamformer architecture that outputs P parallel beamformed signals according to the invention.

FIG. 6 shows another embodiment 601 of the invention, in which the beamformer architecture 301 is modified to process $$N = \frac{L}{P}$$

aperture elements per channel to produce P parallel beams. The beamformer 601 comprises a plurality of channels 603-1, . . . , $$603 - \frac{E}{N}$$

(collectively 603, only the first and last of the channels shown), P summation units 605-1, . . . , 605-P, L=(P×N)

subsum adders 635-1, ... 635-N and 635-(PN–N+1), ..., 635-PN, and delay units 625-1, ..., 625-N and 625-(PN–N+1), ..., 625-PN and P interpolation filters 622-1, ..., 622-P.

Each channel 603 receives as input $$N = \frac{L}{P}$$

amplified, filtered and digitized signals 107-1, ..., 107-N from a subset of the E aperture elements of an ultrasound transducer array (not shown) and includes a multiplexer 608, a dual-port delay memory 609, sum controllers 611-1, ..., 611-N and 611-(PN–N+1), ..., 611-PN an apodization multiplier 613, a delay controller 615, an apodization controller 617 and demultiplexing registers 612-1, ..., 612-N and 612-(PN–N+1), ..., 612-PN.

Each channel's (603) dual-port delay memory 609 is partitioned into N areas, each allocated to one of the N inputs 107.

Each channel 603 of the beamformer 601 multiplexes 608 the N input signals 107 and delays 609 and apodizes them 613 in a time-multiplexed fashion. The multiplexed signals are then demultiplexed 612, gated 611 at the output and coupled to the N subsum adders 635-1, ..., 635-N and 635-(PN–N+1), ..., 635-PN. Each of the N signals 107 are processed by the respective channel 603 P times, once for each of the P output parallel beams. FIG. 6 shows the P×N demultiplexing registers 612 and sum control units 611 organized into P groups of N units each, each group processing the signals for one parallel beam. The subsum adders' 635 outputs are time-aligned via the delay units 625-1, ..., 625-N and 625-(PN–N+1), ..., 625-PN (implemented, for example, with shift registers) and summed together 605. The P×N subsum adders 635 and delay units 625 are also organized into P groups of N, with each P group coupled to one summation unit 605. Each of the summed signals are coupled to one of the P interpolation filters 622-1, ..., 622-P which produce at their output the beamformed signals 623-1, ..., 123-P respectively.

If the circuit elements used to construct the architecture shown in FIG. 6 allows for an operating frequency greater than L×$f_s$, the architecture may be operated in a time-multiplexed fashion to generate two or more parallel beams for each of the P summation groups.

The embodiments of the invention shown in FIGS. 3 and 6 have been described for the most efficient situation in which the circuit clock frequency is an integer multiple of the interpolation factor L times the sampling frequency $f_s$ ($f_{clk}$=K×L×$f_s$) and all the circuit clock cycles are utilized. If the available circuit clock frequency is greater than the minimum necessary, or is not an integer multiple of the interpolation factor L, the invention architectures can still be applied by keeping the circuit idle during the extra clock cycles. If the operating frequency of the delay memory and the multiplier is an integer multiple of the sampling frequency but is less than L×$f_s$, then the principles of the invention still apply but the number N of inputs per channel has to be reduced accordingly.

One or more embodiments of the present invention have been described. Nevertheless, it will be understood that various modifications may be made without departing from the spirit and scope of the invention. Accordingly, other embodiments are within the scope of the following claims.

What is claimed is:
1. A receive beamformer comprising:
one or more beamformer channels

$$\frac{E}{N},$$

where a total number of transducer element E signal samples are coupled to a plurality of channel beamformer inputs N, each beamformer channel comprising:
a plurality of channel beamformer inputs N configured to receive signal samples originating from a plurality of transducer elements E at a predetermined sampling rate $f_s$, each of said plurality of channel beamformer inputs N is associated with a unique transducer element E;
a multiplexer having a plurality of inputs corresponding to the plurality of channel beamformer inputs N and coupled to the plurality of channel beamformer inputs N, and an output, the multiplexer configured to multiplex transducer element signal samples received at the plurality of channel beamformer inputs N at a rate of N$f_s$;
a delay memory having an input coupled to the multiplexer output, a delay control input, and an output, the delay memory configured to store received transducer element signal samples at a rate of N$f_s$;
an apodization multiplier having an input coupled to the output of the delay memory, an apodization control input, and an output, the apodization multiplier configured to receive apodization weights from the apodization control input that correspond with each transducer element's signal sample output by the delay memory and apodizes (multiplies) the transducer element's signal sample with the apodization weight;
a plurality of demultiplexing registers corresponding to the plurality of channel beamformer inputs N, with each demultiplexing register associated with a transducer element, each demultiplexing register having an input coupled to the output of the apodization multiplier, and an output, each demultiplexing register configured to store a transducer element's apodized signal sample;
a plurality of sum controllers corresponding to the plurality of demultiplexing registers, each sum controller having an input coupled to an output of a demultiplexing register, a delay control input, and an output, each sum controller configured to upsample each apodized, transducer element's signal samples by inserting L–1 zero-value samples between each pair of signal samples input to a sum controller, where L is an interpolation factor, and store a subsample part from the delay control input of an overall delay and output either a transducer element's apodized signal sample or a zero-value sample depending on the subsample part; and
one or more subsummers corresponding to the plurality of sum controllers, each subsummer having a plurality of inputs corresponding to the number of channels $$\frac{E}{N},$$

each input coupled to outputs from channel sum controllers that have the same timing delay and an output, each subsummer configured to sum together the delayed, apodized, and upsampled transducer element signal samples from each channel sum controllers that have the same timing delay;

one or more delays corresponding to the one or more subsummers, each delay having an input coupled to an output of a subsummer, and an output, each delay configured to time-align its delayed, apodized, upsampled, summed transducer element signal sample with all other delayed, apodized, upsampled, summed transducer element signal samples in the plurality of delays;

a summer having one or more inputs corresponding to the plurality of delays, each input coupled to a delay output, and an output, the summer configured to sum all of the plurality of delayed, apodized upsampled, summed and time-aligned transducer element signal samples;

an interpolation filter having an input coupled to the summer output and a receive beamformer output, the interpolation filter configured to filter the summed signal samples and output a beamformed signal at the predetermined sampling rate $f_s$;

an apodization controller having an apodization control output coupled to the one or more beamformer channels' apodization multipliers, the apodization controller configured to output an apodization weight to each beamformer channel's apodization multiplier for each delayed transducer element's signal samples output from the delay memory; and a delay controller having a delay control output coupled to the one or more beamformer channels' delay memories and sum controllers, the delay controller configured to output signal samples from each beamformer channel's delay memory belonging to each transducer element at a predetermined delay at a rate of $Nf_s$, and control each beamformer channel's sum controllers with a subsample part to produce partial sums wherein the apodization multiplier, demultiplexing registers, and sum controllers operate at a rate of $Nf_s$.

2. The beamformer according to claim 1 wherein each beamformer channel delay memory further comprises a plurality of predetermined memory areas corresponding to the number of channel beamformer inputs N.

3. The beamformer according to claim 2 wherein the predetermined memory areas are configured as circular memories.

4. The beamformer according to claim 1 wherein the interpolation filter is configured as a low-pass filter.

5. The beamformer according to claim 1 wherein the predetermined delay is programmable.

6. A beamforming method comprising:
receiving a plurality of signal samples taken from a corresponding number of transducer elements N at a predetermined sampling rate $f_s$;
storing the received signal samples corresponding to each transducer element in predetermined portions of a delay memory at a rate of $Nf_s$;
outputting the stored signal samples corresponding to each transducer element after a predetermined delay in a predetermined order;
apodizing each delayed signal sample output from the delay memory by multiplying each delayed signal sample corresponding to a transducer element with a weight;
upsampling the delayed and apodized signal samples corresponding to each transducer element by inserting L−1 zero-value samples between each pair of delayed and apodized signal samples, where L is an interpolation factor;
time-aligning each delayed, apodized, and upsampled signal sample corresponding to each transducer element;
summing all of the time-aligned, delayed, apodized, and upsampled signal sample corresponding to each transducer element; and
filtering the summed signal samples to form a beamformed signal.

7. The beamforming method according to claim 6 wherein filtering is performed using a low-pass filter.

8. The beamforming method according to claim 6 wherein the predetermined delay is programmable.

9. A beamforming method comprising:
receiving a plurality of signal sample streams E taken from a corresponding number of transducer elements at a predetermined sampling rate $f_s$;
dividing the signal sample streams E into a plurality of channels yielding a number of signal streams per channel N;
for each channel;
storing the received signal samples corresponding to each transducer element in predetermined portions of a delay memory at a rate of $Nf_s$;
outputting the stored signal samples corresponding to each transducer element after a predetermined delay in a predetermined order;
apodizing each delayed signal sample output from the delay memory by multiplying each delayed signal sample corresponding to a transducer element with a weight;
upsampling the delayed and apodized signal samples corresponding to each transducer element by inserting L−1 zero-value samples between each pair of delayed and apodized signal samples, where L is an interpolation factor;
summing each delayed, apodized and upsampled signal sample stream in each channel with another delayed, apodized and upsampled signal sample stream from another channel;
time-aligning each delayed, apodized, upsampled and summed signal sample stream;
summing all of the time-aligned, delayed, apodized, and upsampled signal sample streams; and
filtering the summed signal samples to form a beamformed signal.

10. The beamforming method according to claim 9 wherein filtering is performed using a low-pass filter.

11. The beamforming method according to claim 9 wherein the predetermined delay is programmable.

12. A receive beamformer outputting parallel beams comprising:
one or more beamformer channels $$\frac{E}{N},$$

where a total number of transducer element E signal samples are coupled to a plurality of channel beamformer inputs N, each beamformer channel comprising:
a plurality of beamformer inputs N configured to receive signal samples originating from a plurality of transducer elements E at a predetermined sampling rate $f_s$, each of said plurality of beamformer inputs N associated with a unique transducer element E;

a multiplexer having a plurality of inputs corresponding to the plurality of beamformer inputs N and coupled to the plurality of beamformer inputs N, and an output, the multiplexer configured to multiplex transducer element signal samples received at the plurality of beamformer inputs N at a rate of $Nf_s$, where $$N = \frac{L}{P},$$

where L is an interpolation factor and P is the number of parallel beams output;

a delay memory having an input coupled to the multiplexer output, a delay control input, and an output, the delay memory configured to store received transducer element signal samples at a rate of $Nf_s$, and output each transducer element signal sample P times at a rate of $Lf_s$, each time output after a predetermined delay;

an apodization multiplier having an input coupled to the output of the delay memory, an apodization control input, and an output, the apodization multiplier configured to receive apodization weights from the apodization control input that correspond with each transducer element's signal sample output by the delay memory and apodizes (multiplies) the transducer element's signal sample with the apodization weight;

for each parallel beam P:

a plurality of demultiplexing registers corresponding to the plurality of beamformer channel inputs N, with each demultiplexing register associated with a transducer element, each demultiplexing register having an input coupled to the output of the apodization multiplier, and an output, each demultiplexing register configured to store a transducer element's apodized signal sample;

a plurality of sum controllers corresponding to the plurality of demultiplexing registers, each sum controller having an input coupled to an output of a demultiplexing register, a delay control input, and an output, each sum controller configured to upsample each apodized, transducer element's signal samples by inserting L-1 zero-value samples between each pair of signal samples input to a sum controller, where L is an interpolation factor, and store a subsample part specific to each beam P from the delay control input of an overall delay and output either a transducer element's apodized signal sample or a zero-value sample depending on the subsample delay part;

a plurality of subsummers corresponding to the plurality of sum controllers per channel, each subsummer having a plurality of inputs corresponding to the number of channels $$\frac{E}{N},$$

each input coupled to outputs from channel sum controllers that have the same timing delay and an output, each subsummer configured to sum together the delayed, apodized, and upsampled transducer element signal samples from each channel sum controllers that have the same timing delay;

a plurality of delays corresponding to the plurality of sum controllers, each delay having an input coupled to an output of a sum controller, and an output, each delay configured to time-align its delayed, apodized, upsampled transducer element signal sample with all other delayed, apodized, upsampled transducer element signal samples in the plurality of delays;

a summer having a plurality of inputs corresponding to the plurality of delays and an output, each input coupled to a delay output, the summer configured to sum all of the plurality of delayed, apodized, upsampled and time-aligned transducer element signal samples;

an interpolation filter having an input coupled to the summer output, and a receive beamformer output, the interpolation filter configured to filter and decimate the summed signal samples and output a beamformed signal at the predetermined sampling rate $f_s$;

an apodization controller having an apodization control output coupled to the apodization multiplier, the apodization controller configured to output an apodization weight to the apodization multiplier for each delayed transducer element signal sample output from the delay memory specific to each beam P; and a delay controller having a delay control output coupled to the delay memory and each sum controller, the delay controller configured to output signal samples from the delay memory belonging to each transducer element at a predetermined delay at a rate of $Lf_s$ specific to each beam P, and control each sum controller with a subsample part to produce partial sums specific to each beam P wherein the apodization multiplier, demultiplexing registers, and sum controllers operate at a rate of $Lf_s$.

13. The beamformer according to claim 12 wherein each beamformer channel delay memory further comprises a plurality of predetermined memory areas corresponding to the number of channel beamformer inputs N.

14. The beamformer according to claim 13 wherein the predetermined memory areas are configured as circular memories.

15. The beamformer according to claim 12 wherein the interpolation filter is configured as a low-pass filter.

16. The beamformer according to claim 12 wherein the predetermined delay is programmable.

17. A parallel beamforming method comprising:

receiving a plurality of signal samples originating from a corresponding number of transducer elements E at a predetermined sampling rate $f_s$;

determining a number of parallel beams P to be formed;

determining a number of input signals per channel $$N = \frac{L}{P},$$

where L is an interpolation factor;

dividing the signal sample streams E into a plurality of channels yielding a number of signal streams per channel N;

for each channel;

storing the received signal samples corresponding to each transducer element in predetermined portions N of a delay memory at a rate of $Nf_s$;

outputting the stored signal samples corresponding to each transducer element P times, each time for a different beam P and delayed by a predetermined amount;

apodizing each delayed signal sample output from the delay memory, by multiplying each delayed signal sample corresponding to a transducer element with a predetermined weight for each transducer element;

upsampling the delayed and apodized signal samples corresponding to each transducer element P times, each time for a different beam P by inserting L−1 zero-value samples between each pair of delayed and apodized signal samples belonging to the same transducer element, where L is an interpolation factor;

for each beam P;
  summing the corresponding delayed, apodized and upsampled signal sample streams of all channels to form subsums;
  time-aligning each subsum of delayed, apodized, upsampled signal sample streams;
  summing all of the time-aligned subsums of delayed, apodized signal sample streams; and
  filtering the summed signal samples to form a beam-formed signal.

* * * * *